(12) United States Patent
Kao et al.

(10) Patent No.: US 10,338,760 B2
(45) Date of Patent: Jul. 2, 2019

(54) TOUCH SENSOR UNIT AND TOUCH SENSOR DEVICE

(71) Applicant: TPK Universal Solutions Limited, Hong Kong (CN)

(72) Inventors: Kuo-Feng Kao, Xinbei (TW); Sheng-Wen Lin, Taoyuan (TW); Po-Yi Wu, Taoyuan (TW); Shiang-Ting Wu, Taoyuan (TW)

(73) Assignee: TPK Universal Solutions Limited, Hong Kong (HK)

( * ) Notice: Subject to any disclaimer, the term of this patent is extended or adjusted under 35 U.S.C. 154(b) by 57 days.

(21) Appl. No.: 14/751,132

(22) Filed: Jun. 26, 2015

(65) Prior Publication Data

US 2015/0378464 A1 Dec. 31, 2015

(30) Foreign Application Priority Data

Jun. 27, 2014 (CN) .......................... 2014 1 0301580

(51) Int. Cl.
*G06F 3/041* (2006.01)
*G09G 3/36* (2006.01)
*G06F 3/045* (2006.01)
*G06F 3/044* (2006.01)

(52) U.S. Cl.
CPC .............. *G06F 3/045* (2013.01); *G06F 3/044* (2013.01); *G06F 2203/04103* (2013.01); *G06F 2203/04112* (2013.01)

(58) Field of Classification Search
CPC .......... G06F 3/042; G06F 3/044; G06F 3/045; G06F 2203/04103; G06F 2203/04112
See application file for complete search history.

(56) References Cited

U.S. PATENT DOCUMENTS

| | | | |
|---|---|---|---|
| 2013/0319729 A1* | 12/2013 | Poon ..................... | H05K 1/0296 174/250 |
| 2014/0078422 A1* | 3/2014 | Tanabe ..................... | B32B 7/02 349/12 |
| 2014/0085551 A1* | 3/2014 | Koo ........................ | G06F 3/041 349/12 |
| 2014/0184950 A1* | 7/2014 | Chu ...................... | G06F 3/0416 349/12 |
| 2015/0036298 A1* | 2/2015 | Kim ........................ | B32B 7/12 361/748 |
| 2015/0359105 A1* | 12/2015 | Yoon .................... | H05K 1/0213 174/268 |
| 2016/0081184 A1* | 3/2016 | Katagiri .............. | H01L 51/0021 174/268 |

* cited by examiner

*Primary Examiner* — Nelson M Rosario
(74) *Attorney, Agent, or Firm* — Cooper Legal Group, LLC

(57) ABSTRACT

A touch sensor unit includes a substrate and a plurality of touch electrodes disposed on the substrate for generating sensing signals. Each of the touch electrodes includes an electrically insulating layer that is light-transmissible, and a plurality of nano-scale conducting elements distributed in the electrically insulating layer and electrically connected to one another. Each of the conducting elements includes a metal body that has a roughened surface, that has a twisted structure, or that is formed with a light light-absorbing member thereon.

26 Claims, 7 Drawing Sheets

TOUCH SENSOR UNIT AND TOUCH SENSOR DEVICE

BACKGROUND OF THE INVENTION

This application claims priority of Chinese Patent Application No. 201410301580.8, filed on Jun. 27, 2014.

FIELD OF THE DISCLOSURE

The disclosure relates to a touch sensor unit and a touch sensor device, and more particularly to a touch sensor unit including low reflective touch electrodes and a touch sensor device including the touch sensor unit.

BACKGROUND OF THE DISCLOSURE

Indium tin oxide (ITO) is a transparent conductive material, and is widely used for making touch electrodes of a touch sensor device. However, owing to the unsatisfactory transparency and electrical conductivity as well as the relatively high cost of ITO, techniques were developed to enable usage of materials such as silver nanowires for making touch electrodes. Touch electrodes made from silver nanowires have high transparency and superior electrical conductivity.

SUMMARY OF THE DISCLOSURE

Therefore, the object of the present invention is to provide a touch sensor unit that may alleviate at least one of the drawbacks associated with the abovementioned prior arts.

According to a first aspect of the present invention, a touch sensor unit includes a substrate and a plurality of touch electrodes disposed on the substrate for generating sensing signals. Each of the touch electrodes includes an electrically insulating layer that is light-transmissible, and a plurality of nano-scale conducting elements that are distributed in the electrically insulating layer and electrically connected to one another. Each of the conducting elements includes a metal body that has a roughened surface.

According to a second aspect of the present invention, a touch sensor unit includes a substrate and a plurality of touch electrodes disposed on the substrate for generating sensing signals. Each of the touch electrodes includes an electrically insulating layer that is light-transmissible, and a plurality of nano-scale conducting elements that are distributed in the electrically insulating layer and electrically connected to one another. Each of the conducting elements includes a metal body and a light-absorbing member that has a refractivity lower than that of the substrate and that is disposed on the metal body.

According to a third aspect of the present invention, a touch sensor unit includes a substrate and a plurality of touch electrodes disposed on the substrate for generating sensing signals. Each of the touch electrodes includes an electrically insulating layer that is light-transmissible, and a plurality of nano-scale conducting elements that are distributed in the electrically insulating layer and electrically connected to one another. Each of the conducting elements includes a metal body that has a twisted structure.

According to a fourth aspect of the present invention, a touch sensor device includes a cover plate and two touch sensor units as previously described. The touch sensor units are laminated together and disposed under the cover plate. The touch electrodes in one of the touch sensor units are not parallel to the touch electrodes in the other one of the touch sensor units.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
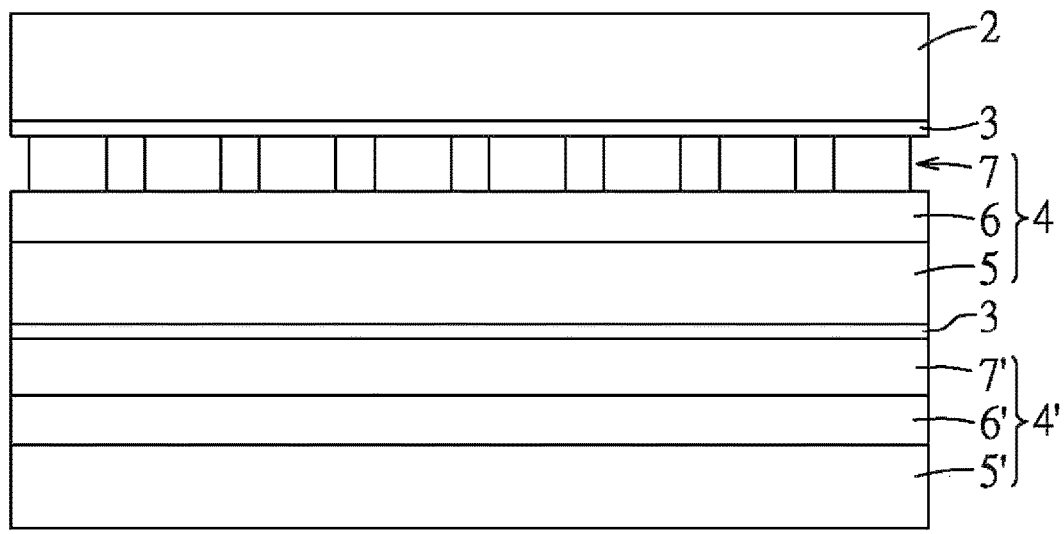
FIG. 1 is a side view showing the general structure of each of the first, second, third and fourth embodiments of a touch sensor device according to the present invention.
Figure 2:
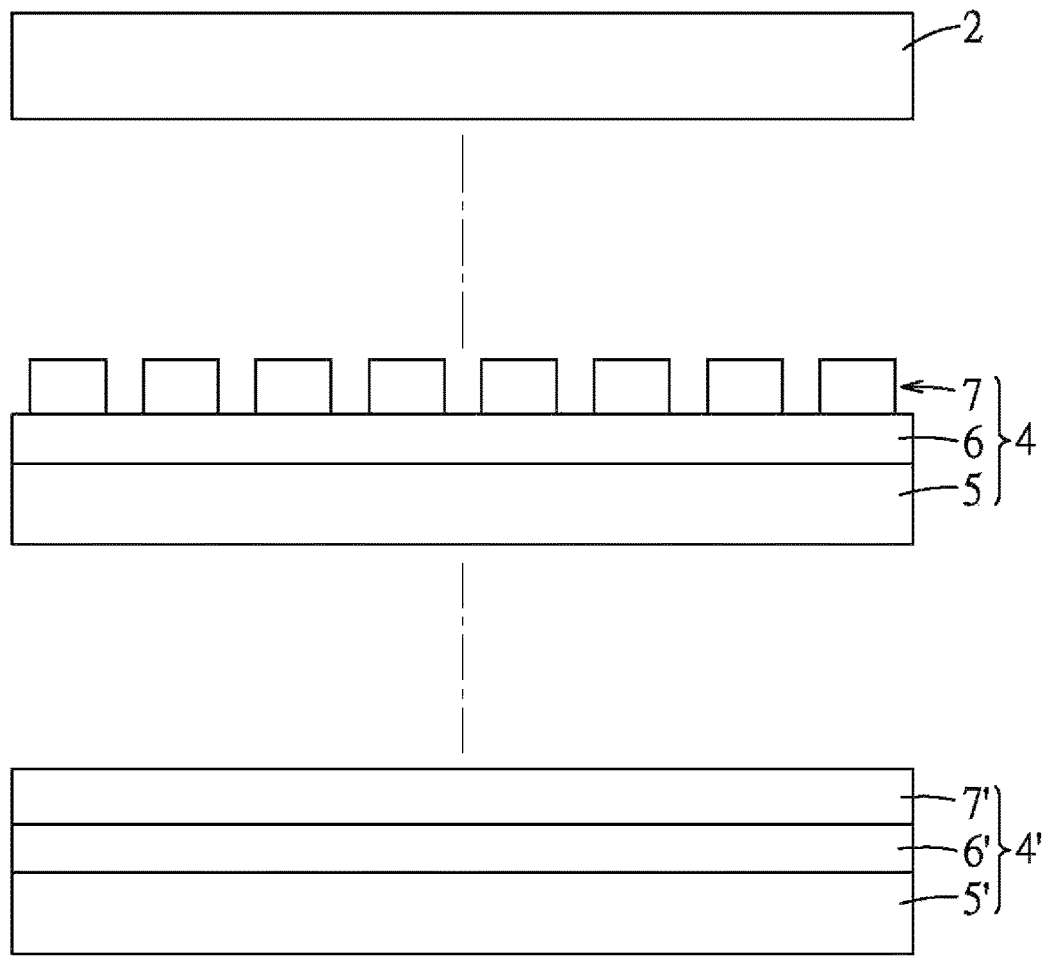
FIG. 2 is a partially exploded side view of the touch sensor device shown in FIG. 1.
Figure 3:
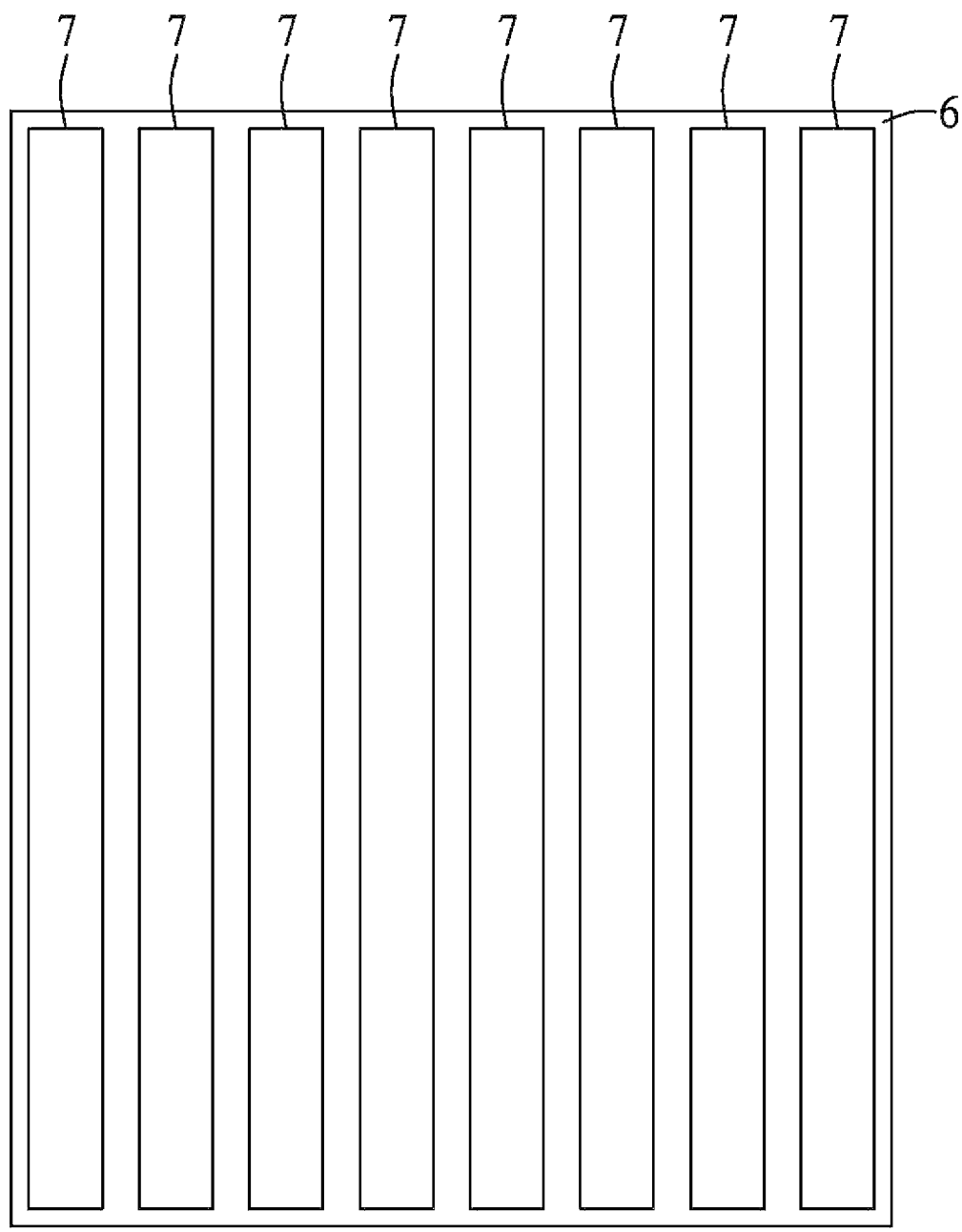
FIG. 3 is a top view showing a touch sensor unit included in the touch sensor device shown in FIG. 1.

First Touch Sensor Device:

FIGS. 1 to 3 show a touch sensor device 1 according to at least one embodiment. The touch sensor device 1 may be used in electronic devices such as mobile phones, tablet computers, etc. The touch sensor device 1 includes a cover plate 2, a plurality of adhesive layers 3, a first touch sensor unit 4, a second touch sensor unit 4', a black matrix (BM) (not shown) and metal wirings (not shown).

The cover plate 2 is a top layer of the touch sensor device 1 and may be made from, e.g., glass or other transparent materials. The first and second touch sensor units 4, 4' are disposed under the cover plate 2 and are laminated with the cover plate 2 by the adhesive layers 3. The first touch sensor unit 4 includes a substrate 5, a plurality of touch electrodes 7 disposed on the substrate 5 for generating sensing signals, and an anti-reflective element 6. The second touch sensor unit 4' includes a substrate 5', a plurality of touch electrodes 7' disposed on the substrate 5', and an anti-reflective element 6'. The touch electrodes 7 of the first touch sensor unit 4 are not parallel to the touch electrodes 7' of the second touch sensor unit 4' for generating sensing signals in different axes. The first and second touch sensor units 4, 4' have the same structure. Therefore, only the first touch sensor unit 4 will be elaborated below for the sake of brevity. The substrate 5 holds the anti-reflective element 6 and the touch electrodes 7, and may be made from hard glass, flexible polyethylene terephthalate (PET), or other light-transmissible materials.

Figure 4:
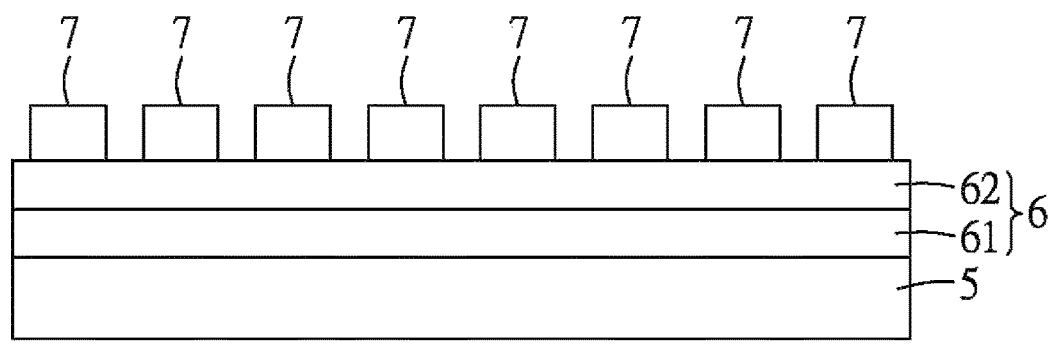
FIG. 4 is a side view showing a variation of the touch sensor unit of FIG. 3.
Figure 5:
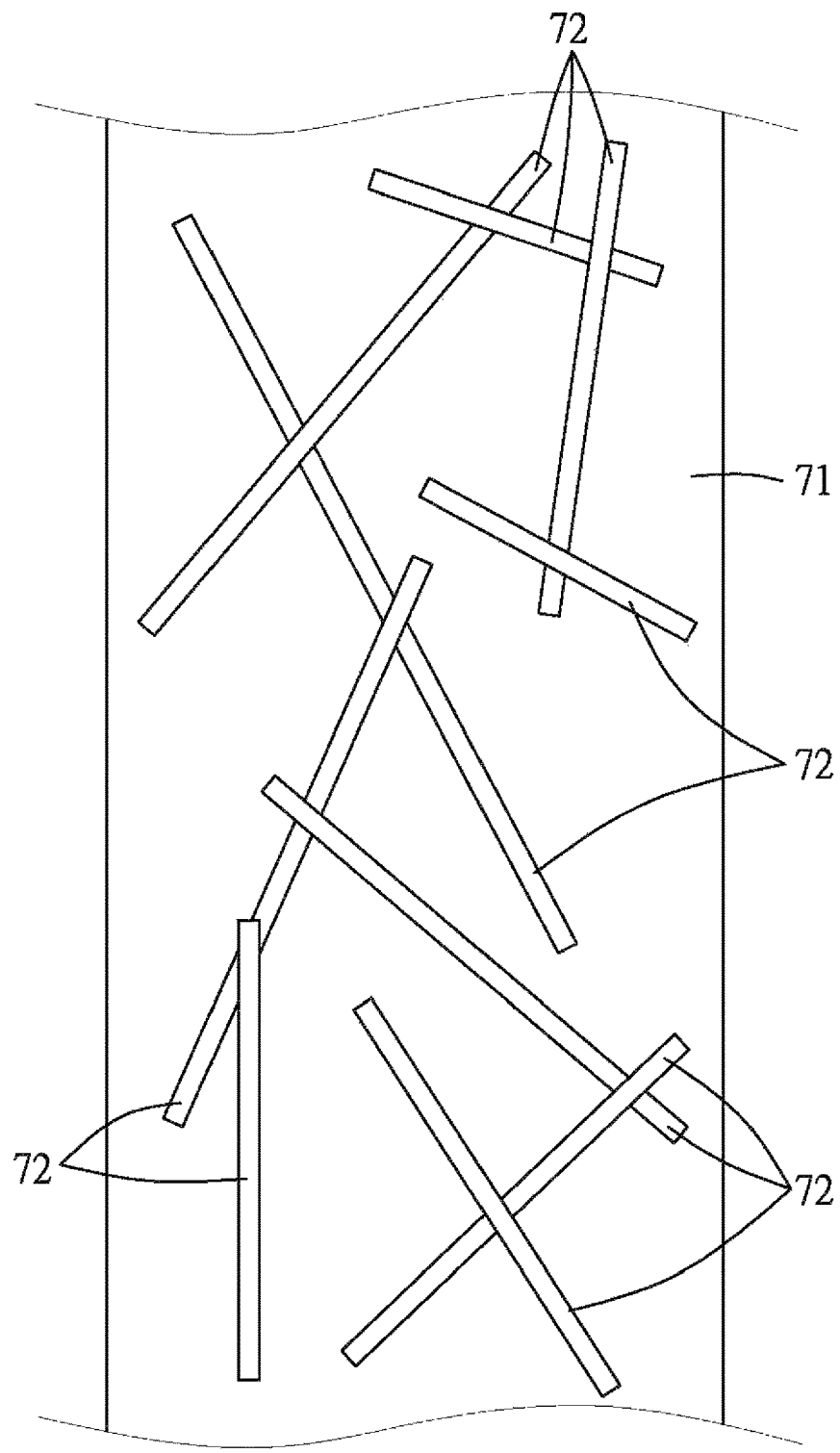
FIG. 5 is a fragmentary enlarged view showing the general structure of a touch electrode of the touch sensor unit of the embodiments.
Figure 6:
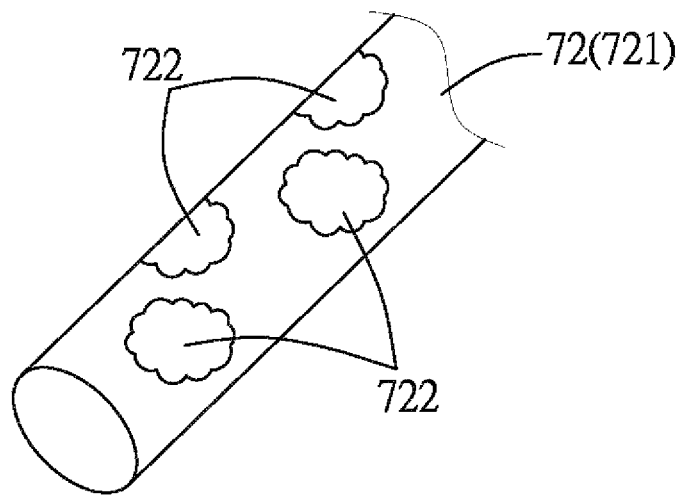
FIG. 6 shows a nano-scale conducting element included in the first embodiment.

The anti-reflective element 6 is disposed between the substrate 5 and the touch electrodes 7, and has a refractivity ranging between that of the substrate 5 and that of the touch electrodes 7. That is, the refractivity of the anti-reflective element 6 is lower than that of the substrate 5 and higher than that of the touch electrodes 7, so that reflection of incident light will be reduced when the incident light passes through the first touch sensor unit 4. Referring further to FIG. 4, an alternative structure of the anti-reflective element 6 includes a first optical layer 61 and a second optical layer 62 laminated with the first optical layer 61. The first optical layer 61 is disposed between the substrate 5 and the second optical layer 62 and has a refractivity larger than that of the second optical layer 62, so as to further improve the anti-reflective effect of the first touch sensor unit 4. In some embodiments, the first optical layer 61 is made of niobium pentoxide ($Nb_2O_5$), silicon nitride ($SiN_x$), etc., and has a refractivity between 1.70 and 2.30. In some embodiments, the second optical layer 62 is a material made by, e.g. $SiO_2$, that has a refractivity between 1.70 and 2.30. In some embodiments, the anti-reflective element 6 has more than two optical layers or is omitted in the first touch sensor unit 4. In some embodiments where the anti-reflective element 6 has more than two optical layers, the optical layers are disposed between the substrate 5 and the touch electrodes 7, and have a refractivity gradient increasing from the touch electrodes 7 toward the substrate 5 so as to provide superior anti-reflective effect.

Referring to FIGS. 2, 3, 5 and 6, the touch electrodes 7 are disposed on the substrate 5 and the anti-reflective element 6, are spaced apart from one another, and include nano-scale metal to form a main structure for generating sensing signals. Each of the touch electrodes 7 includes an electrically insulating layer 71 and a plurality of nano-scale conducting elements 72 distributed in the electrically insulating layer 71 (see FIG. 5).

The electrically insulating layer 71 is light-transmissible and encapsulates the nano-scale conducting elements 72 for electrical insulation and protection.

Figure 7:
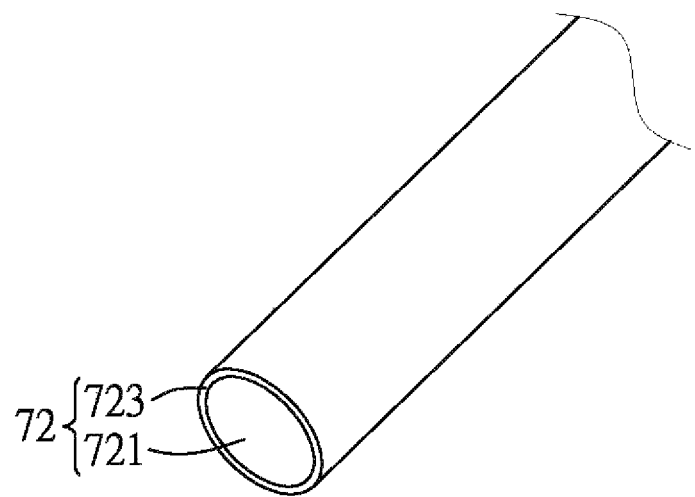
FIG. 7 shows a nano-scale conducting element included in the second embodiment.
Figure 8:
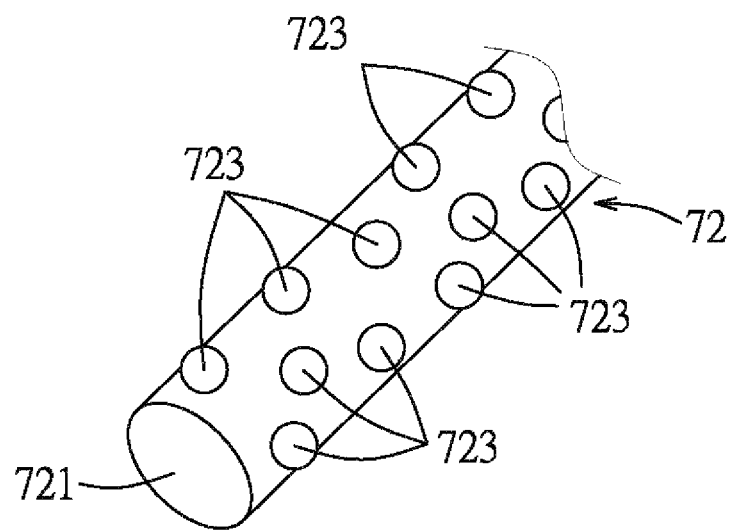
FIG. 8 shows a nano-scale conducting element included in the third embodiment.

Each of the nano-scale conducting elements 72 includes a metal body 721 (FIG. 6 and FIG. 7) that, in some embodiments, is a nano-scale metal wire such as silver nanowire, copper nanowire, etc., and that is embedded in the electrically insulating layer 71 and electrically connected to the metal body 721 of an adjacent one of the nano-scale conducting elements 72 so that the nano-scale conducting elements 72 of each of the touch electrodes 7 are electrically connected to one another. The metal body 721 of each of the conducting elements 72 is formed with a plurality of recesses 722 on the surface thereof by electron beam etching, ion beam etching, or chemical etching, etc. so as to form a roughened surface. The roughened surface of the metal body 721 of each of the conducting elements 72 has a surface roughness ranging from 2 nm to 20 nm, preventing the reflection of incident light from an otherwise smooth surface of the metal body 721. Therefore, in some embodiments, the metal body 721 of each of the conducting elements 72 of the touch electrodes 7 is processed to have the roughened surface so that the reflection of incident light could be reduced and the image quality of a display device provided with the touch sensor device 1 of this disclosure could be improved.

It should be particularly noted that, although the touch electrodes 7 in some embodiments are separated from one another, in certain embodiments, the touch electrodes 7 may be designed to have a structure where the electrically insulating layers 71 of the touch electrodes 7 are connected with one another, and where the conducting elements 72 of each of the touch electrodes 7 are electrically insulated from the conducting elements 72 of an adjacent one of the touch electrodes 7.

Second Touch Sensor Device:

Referring to FIGS. 1, 2, 5 and 7, the touch sensor device 1 has a structure similar to that described above. The difference resides in the configuration of the conducting elements 72 of each of the touch electrodes 7.

To be more specific, in some embodiments, each of the conducting elements 72 includes a metal body 721 and a light-absorbing member 723 disposed on the metal body 721. The metal body 721 of each of the conducting elements 72 may be a nano-scale metal wire such as silver nanowire, copper nanowire, etc. The light-absorbing member 723 is an anti-reflective layer that completely covers a surface of the metal body 721 and that has a refractivity lower than that of the substrate 5. For example, the light-absorbing member 723 may be a pigment layer that is attached on the surface of the metal body 721 of each of the conducting elements 72 through dyeing techniques. The low reflectivity of the pigment layer effectively alleviates the light reflection problem of the conducting elements 72. In other configurations, the light-absorbing member 723 are made by chemical synthesis. In some embodiments, when the metal body 721 of each of the conducting elements 72 is a silver nanowire, silver sulfide is formed on the surface of the metal body 721 by sulfurization to function as the light-absorbing member 723. In some embodiments, when the metal body 721 is a copper nanowire, copper oxide is formed on the surface of the metal body 721 by oxidation to function as the light-absorbing member 723. By completely covering the surface of the metal body 721 of each of the conducting elements 72 with the light-absorbing member 723, light reflection problem attributed to the metal body 721 is effectively alleviated, thereby improving the image quality of a display device having the touch sensor device 1.

Third Touch Sensor Device:

Referring to FIGS. 1, 2, 5 and 8, a third configuration of the touch sensor device 1 according to the present disclosure has a structure similar to that described above. The difference resides in the configuration of the light-absorbing member 723 of each of the conducting elements 72.

Different from the above, where the light-absorbing member 723 is an anti-reflective layer completely covering the metal body 721, in some embodiments, the light-absorbing member 723 of each of the conducting elements 72 is a plurality of anti-reflective particles attached onto the surface of the metal body 721. In some embodiments, the anti-reflective particles are made from electrically conductive carbon black to reduce the light reflection problem of the metal body 721, and can improve the image quality of a display device having the touch sensor device 1.

Figure 9:
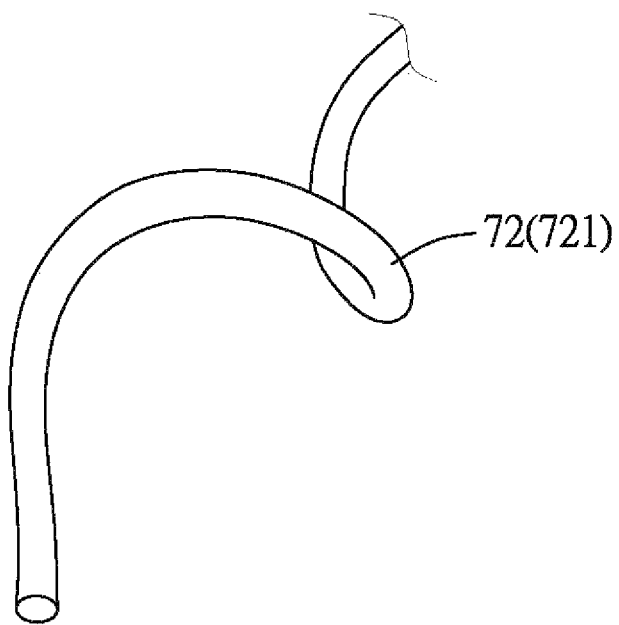
FIG. 9 shows a nano-scale conducting element included in the fourth embodiment.

Fourth Touch Sensor Device:

Referring to FIGS. 1, 2 and 9, a fourth configuration of the touch sensor device 1 according to the present disclosure has a structure similar to that of the first touch sensor device 1. The difference resides in the configuration of the metal body 721 of each of the conducting elements 72.

To be more specific, while in the first configuration, the metal body 721 of each of the conducting elements 72 is formed with the roughened surface by etching, the metal body 721 of each of the conducting elements 72 in some other embodiments is processed to have a twisted structure that could also reduce the light reflection problem. In some embodiments, the twisted structure of the metal body 721 of each of the conducting elements 72 is formed by magnetizing the metal body 721 and applying an electric force or a magnetic force to the metal body 721. It should be noted, however, that the process for forming the twisted structure and the shape of the twisted structure are not limited thereto.

By processing the metal body 721 of each of the conducting elements 72 to have the roughened surface or the twisted structure, or by forming the layer-type of particle-type light-absorbing member 723 on the surface of the metal body 721, the light reflection problem can be reduced, thereby improving the image quality of a display device having the touch sensor device 1. It should be particularly pointed out that, based on practical requirements, the configurations of the touch electrodes 7 in the abovementioned embodiments may be combined to accomplish improved image quality for the touch sensor device 1. For example, the metal body 721 with the roughened surface may be processed to also have the twisted structure. Alternatively, the metal body 721 having the roughened surface may be formed with the light-absorbing member 723. In addition, the metal body 721 having the twisted structure may also be formed with the light-absorbing member 723. Moreover, the metal body 721 of each of the conducting elements 72 may simultaneously have the roughened surface, the twisted structure and the light-absorbing member 723. Configuration of the touch sensor device 1 could be adjusted based on practical requirements and should not be limited by the embodiments disclosed herein.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A touch sensor unit, comprising:
   a substrate;
   a plurality of touch electrodes disposed on said substrate for generating sensing signals, wherein each of said plurality of touch electrodes comprises:
   an electrically insulating layer that is light-transmissible, and
   a plurality of nano-scale conducting wires distributed in said electrically insulating layer and electrically connected to one another, wherein each of said plurality of nano-scale conducting wires comprises a processed structure, and the processed structure comprises a layer-type light-absorbing member or a particle-type light-absorbing member, and
   an anti-reflective element that has a first refractivity, wherein said first refractivity is lower than a second refractivity of said substrate, and said first refractivity is higher than a third refractivity of said plurality of touch electrodes, wherein said anti-reflective element is disposed between said substrate and said plurality of touch electrodes.

2. The touch sensor unit as claimed in claim 1, wherein each of said plurality of nano-scale conducting wires has a roughened surface having a surface roughness ranging from 2 nm to 20 nm.

3. The touch sensor unit as claimed in claim 2, wherein said roughened surface is formed by electron beam etching, ion beam etching or chemical etching a surface of said plurality of nano-scale conducting wires.

4. The touch sensor unit as claimed in claim 1, wherein said plurality of nano-scale conducting wires are silver nanowires or copper nanowires.

5. The touch sensor unit as claimed in claim 1, wherein:
   said anti-reflective element comprises a first optical layer and a second optical layer,
   said first optical layer is disposed between said substrate and said second optical layer, and
   a refractivity of said first optical layer is larger than a refractivity of said second optical layer.

6. The touch sensor unit as claimed in claim 1, wherein:
   said layer-type light-absorbing member surroundingly encloses a corresponding nano-scale conducting wire of said plurality of nano-scale conducting wires.

7. The touch sensor unit as claimed in claim 6, wherein said layer-type light-absorbing member is an anti-reflective shell that completely covers a surface of said corresponding nano-scale conducting wire of said plurality of nano-scale conducting wires.

8. The touch sensor unit as claimed in claim 7, wherein said anti-reflective shell is formed by sulfurization or oxidation a shelled layer on said surface of said corresponding nano-scale conducting wire of said plurality of nano-scale conducting wires.

9. The touch sensor unit as claimed in claim 7, wherein said anti-reflective shell is formed by pigment dyeing or chemical synthesis a shelled layer on said surface of said corresponding nano-scale conducting wire of said plurality of nano-scale conducting wires.

10. The touch sensor unit as claimed in claim 6, wherein each of said plurality of nano-scale conducting wires is twisted.

11. The touch sensor unit as claimed in claim 6, wherein said plurality of touch electrodes are spaced apart from one another.

12. The touch sensor unit as claimed in claim 6, wherein:
   said electrically insulating layers of each of said plurality of touch electrodes are connected with one another, and
   said plurality of nano-scale conducting wires of each of said plurality of touch electrodes are electrically insulated from said plurality of nano-scale conducting wires of an adjacent one of said plurality of touch electrodes.

13. The touch sensor unit as claimed in claim 1, wherein said plurality of nano-scale conducting wires comprise a twisted structure.

14. The touch sensor unit as claimed in claim 13, wherein said twisted structure is formed by magnetizing said plurality of nano-scale conducting wires and applying an electric force or a magnetic force to said plurality of nano-scale conducting wires.

15. The touch sensor unit as claimed in claim 13, wherein said plurality of touch electrodes are spaced apart from one another.

16. The touch sensor unit as claimed in claim 13, wherein:
   said electrically insulating layers of each of said plurality of touch electrodes are connected with one another, and
   said plurality of nano-scale conducting wires of each of said plurality of touch electrodes are electrically insulated from said plurality of nano-scale conducting wires of an adjacent one of said plurality of touch electrodes.

17. The touch sensor unit as claimed in claim 1, wherein said plurality of touch electrodes are spaced apart from one another.

18. The touch sensor unit as claimed in claim 1, wherein:
   said electrically insulating layers of each of said plurality of touch electrodes are connected with one another, and
   said plurality of nano-scale conducting wires of each of said plurality of touch electrodes are electrically insulated from said plurality of nano-scale conducting wires of an adjacent one of said plurality of touch electrodes.

19. The touch sensor unit as claimed in claim 1, wherein said particle-type light-absorbing member comprises a plurality of anti-reflective particles attached onto a surface of a corresponding nano-scale conducting wire of said plurality of nano-scale conducting wires.

20. The touch sensor unit as claimed in claim 19, wherein said plurality of anti-reflective particles is made from electrically conductive carbon black.

21. A touch sensor unit, comprising:
a substrate; and
a plurality of touch electrodes disposed on said substrate for generating sensing signals, wherein each of said plurality of touch electrodes comprises:
an electrically insulating layer that is light-transmissible, and a plurality of nano-scale conducting wires distributed in said electrically insulating layer and electrically connected to one another, wherein each of said plurality of nano-scale conducting wires comprises a processed structure, and the processed structure comprises a layer-type light-absorbing member, wherein said layer-type light-absorbing member is an anti-reflective shell that completely covers a surface of said corresponding nano-scale conducting wire of said plurality of nano-scale conducting wires.

22. The touch sensor unit as claimed in claim 21, wherein said anti-reflective shell is formed by sulfurization or oxidation a shelled layer on said surface of said corresponding nano-scale conducting wire of said plurality of nano-scale conducting wires.

23. The touch sensor unit as claimed in claim 21, wherein said anti-reflective shell is formed by pigment dyeing or chemical synthesis a shelled layer on said surface of said corresponding nano-scale conducting wire of said plurality of nano-scale conducting wires.

24. The touch sensor unit as claimed in claim 21, wherein said plurality of nano-scale conducting wires are silver nanowires or copper nanowires.

25. The touch sensor unit as claimed in claim 21, wherein said plurality of nano-scale conducting wires comprise a twisted structure.

26. The touch sensor unit as claimed in claim 25, wherein said twisted structure is formed by magnetizing said plurality of nano-scale conducting wires and applying an electric force or a magnetic force to said plurality of nano-scale conducting wires.

* * * * *